United States Patent [19]

Cowan

[11] Patent Number: 4,531,594

[45] Date of Patent: Jul. 30, 1985

[54] METHOD AND COMPOSITIONS FOR FLUID LOSS AND SEEPAGE LOSS CONTROL

[75] Inventor: Jack C. Cowan, Lafayette, La.

[73] Assignee: Venture Chemicals, Inc., Lafayette, La.

[21] Appl. No.: 436,265

[22] Filed: Oct. 25, 1982

[51] Int. Cl.$^3$ .............................. C09K 7/06; E21B 7/00
[52] U.S. Cl. .................................... 175/72; 252/8.5 C; 252/8.5 LC; 252/8.5 P
[58] Field of Search ........... 252/8.5 A, 8.5 C, 8.5 LC, 252/8.5 M, 8.5 P; 175/72, 70

[56] References Cited

U.S. PATENT DOCUMENTS

| | | | |
|---|---|---|---|
| 3,040,821 | 6/1962 | Widess | 252/8.5 |
| 3,140,747 | 7/1964 | Mitacek | 252/8.5 X |
| 3,208,523 | 9/1965 | Coyle et al. | 252/8.5 X |
| 3,310,125 | 3/1967 | Darley | 252/8.5 X |
| 3,494,865 | 2/1970 | Andrews et al. | 252/8.5 |
| 3,574,099 | 4/1971 | Ryals et al. | 252/8.5 |
| 3,671,427 | 6/1972 | Andrews et al. | 252/8.5 |
| 3,880,764 | 4/1975 | Donham | 252/8.5 |
| 4,404,107 | 9/1983 | Cowan et al. | 252/8.5 |
| 4,428,843 | 1/1984 | Cowan et al. | 252/8.5 |

*Primary Examiner*—Herbert B. Guynn
*Attorney, Agent, or Firm*—Roy F. House

[57] ABSTRACT

Disclosed is a method of and compositions for reducing the fluid loss from a drilling fluid which allows a low colloid, enhanced penetration rate drilling fluid to be used in a drilling operation. The invention provides a concentrated suspension or pill of a fluid loss control additive and a seepage loss control additive in a liquid which is compatible with the drilling fluid. This pill is circulated throughout a borehole containing the drilling fluid and thereafter isolated from the drilling fluid upon reaching the surface. The fluid loss control additive and the seepage loss control additive deposit on the sides of the borehole, thus reducing the loss of fluid to the formations drilled, and the excess not deposited is subsequently isolated from the drilling fluid so as not to be dispersed throughout the drilling fluid and substantially increasing the colloid content of the drilling fluid.

11 Claims, No Drawings

METHOD AND COMPOSITIONS FOR FLUID LOSS AND SEEPAGE LOSS CONTROL

BACKGROUND OF THE INVENTION

The invention relates to an improved method for decreasing the fluid loss or seepage loss from a drilling fluid, particularly from "relaxed filtrate", low-colloid invert oil emulsion drilling fluids. Compositions which are particularly effective in this class of drilling fluid are also disclosed.

Density is the most important mud property affecting penetration rate. For any given formation pressure, the higher the density, the greater will be the differential pressure and consequently, the greater the static chip hold down, and likelihood of bottom-hole and bit balling. Decreasing mud density decreases dynamic chip hold down, permitting faster rpm, and, by decreasing pressure losses in the drill pipe, increases hydraulic horsepower available at the bit. Thus the lowest possible mud density should always be carried. Whereever possible, an underbalanced mud column should be used. In normally pressured formations, differential pressures should be kept no higher than necessary to establish a filter cake on unconsolidated sands (100 to 200 psi).

Viscosity is another mud property that materially influences penetration rate. Low viscosity promotes fast rates mainly because of good scavenging of cuttings from under the bit. The relevant viscosity is the effective viscosity at the shear rate prevailing under the bit, not the plastic or funnel viscosity. Low viscosities are particularly important at high rotational speeds because of lower dynamic chip hold down. When the bit tooth strikes, the fractures are at first exceedingly small and the viscosity of the filtrate is probably the relevant factor, but as the chips move out, the viscosity of the mud becomes relevant.

The concentration of particulate solids is another mud property that affects drilling rate. High concentration of solids reduce drilling rates because they increase mud density and viscosity, but low concentrations of inert solids have little effect on these properties, yet penetration rates increase sharply as the inert solid content approaches zero. The reason is reduced chip down pressure (CHDP). The actual solids concentration that it is possible to maintain depends on well conditions and the type of mud being used. When drilling in low-permeability sandstones and carbonates that remain true to gauge, it is possible to drill with clear water. Emphasis is placed on the word clear, because field experience has shown that remarkably small amounts of solids can greatly reduce penetration rates. For this reason, small amounts of a flocculation aid, such as 10% hydrolyzed polyacrylamide co-polymer, are added at the flow line. If proper settling facilities are provided, clear water is obtained at the suction. The settling facilities usually consist of large earthen pits, because the flocs are voluminous and their specific gravity is only slightly greater than water. Consequently, their settling rates are low, and they are sensitive to stray currents. Settling efficiency is greatly increased if the pits are baffled to distribute the flow evenly over the whole surface of the pit, and if a weir is placed at the discharge end of the pit to skim clear water from the surface. Because of hindered settling, settling efficiency falls off very rapidly if solids content is allowed to rise much above 1% by volume.

Another type of ultra low-solid fluid (commonly known as milk emulsion) used to drill hard formations consists of water or brine in which 5% diesel oil is emulsified with an oil-wetting surfactant. The emulsified oil is believed to provide a small measure of filtration control, and to protect the drill cuttings from disintegration by the oil-wetting action.

In most holes, filtration control is necessary, and therefore the drilling fluid must have a colloidal base, which makes maintenance of a low solids content more difficult. Some decrease in rate of penetration is inevitable, but quite high rates can be obtained if the bridging solids content can be kept below 4% by weight. If the concentration of bridging solids can be kept low enough, the amount of mud spurt that can invade the formation between successive tooth strikes will be unable to establish an effective internal filter cake, and therefore the static CHDP is minimized. However, unlimited time is available for bridging on the sides of the hole, which are therefore protected by a normal filter cake. At least 0.5% bridging solids are necessary to prevent excessive mud spurts. Thus to obtain fast drilling rates with a mud having filtration control, it is necessary to maintain the bridging solids content between 0.5% and 4%. Bridging solids are particles between 74 and 2 microns.

Obviously such low solids contents can only be maintained when drilling in certain formations and with special muds. The non-dispersing polymer muds have been found the most suitable for this purpose. By coating the cuttings, the polymers inhibit their dispersion into the mud. They have the further advantage of reducing friction in turbulent flow and thus reduce pressure losses in the drill pipe and increase the hydraulic horse power available at the bit.

When drilling with conventional high solid muds, mud properties have much less influence on penetration rates. Variations in viscosity and solids content have a comparatively small effect on penetration rate. There is no direct correlation with filtration properties, although there is a tendency for both to move in the same direction, because both decrease with increase in the colloidal fraction. The only mud property that has a major effect on drilling rate is density.

Although water base muds have been used predominately for drilling oil and gas wells, there are some geological areas where the use of such muds is very costly because of severe bore hole problems that are sometimes encountered. These well bore problems are usually related to shale hydration and other forms of formation instability. Many shale formations are easily destabilized when contacted with various waters, particularly fresh water. Consequently, washouts, sloughing of formations and many other problems related to destabilization occur when water base muds are used. Some formations such as massive salt sections are easily washed out by water base muds and this too can cause severe hole problems. In other cases, differential pressure sticking is a problem very commonly associated with the use of water base muds in low pressure, depleted sands.

Over the years oil muds have come into widespread use in order to provide better well bore stabilization and to minimize drilling problems. One of the drawbacks of the oil base mud systems has been the slower drilling rates as compared to water base mud systems. Recent technical advances using relaxed fluid loss techniques in oil mud systems have resulted in drilling rates comparable to water base muds. These oil base systems are referred to as low-colloid oil muds.

Published laboratory studies show that the low-colloid oil muds can be formulated to provide faster drilling rates while maintaining the performance advantages of conventional oil muds. The characteristics that generally make these low-colloid oil mud systems unique are as follows:

1. low viscosity oil phase;
2. low concentration of emulsified water;
3. high salinity, using calcium chloride or sodium chloride, to saturation;
4. Oil wetting surfactant in order to provide emulsification for the water (no colloidal soaps or asphaltenes);
5. oil dispersible organo-clays that help suspend and provide hole cleaning without high viscosity and high shear rates;
6. no colloidal material for filtration control unless it is required to combat excessive seepage or filtration to the formation. These fast drilling oil muds are designed to limit the concentration of colloidal solids. A low-colloid oil mud having a high spurt loss will allow the liquid phase to penetrate into the cracks that are formed by the drill bit and actually help remove the formation chip. A low viscosity can be maintained in the oil mud if the colloid content is minimal. The low viscosity can also reduce the pressure loss in the drill stem and allow for more hydraulic horsepower to be utilized at the bit. This also helps in chip removal.

A drilling mud system is designed to be a circulating system, hopefully, with all the fluid retained in the system itself. However, various types of losses do occur during the drilling operations. These losses occur on the surface due to storage, evaporation, etc. Other losses occur on the surface as a result of a certain amount of the mud adhering to the drill solids that are finally disposed of from the system. However, the greatest loss of fluid generally occurs down hole during a drilling operation. These losses can take several different forms. For example, large, gross loss of whole fluid (solids and liquid) is commonly referred to as lost circulation. Lost circulation can be anywhere from 100% to only a partial loss of returns down to 20% or 30%. At the other extreme is a loss of only the liquid phase which is generally referred to as fluid loss (liquid phase only). This loss occurs as the result of the actual filtration of the solids by the formation due to a differential pressure from the fluid column to the formation. A generalized category that is referred to as seepage loss occurs when there is a combination of whole loss of fluid coupled with filtration losses. These losses are small but continuous.

Up until about 1973 seepage loss was not considered an important cost of running an oil mud. This was due to the fact that the cost of diesel at that time was in the $0.30/gal range, or approximately $12.60/bbl. No. 2 diesel fuel, which is the most commonly available oil used in oil base muds, represented a very insignificant cost of the drilling fluid. However, as the price of oil increased to above $1.00/gal, even small losses over a period of time became important. Table 1 shows projected costs of small losses of oil base mud drilling fluid over a period of 24 hours up to 30 day usage. As can be seen from this table, seepage loss/fluid loss in oil muds can be a significant cost in running the already expensive oil mud systems.

With the advent of "relaxed fluid-loss" or low-colloid oil muds, even higher losses can and do occur. A recognized offset to this cost, however, is the potential reduction in the amount of time an oil mud is used due to the increase in penetration rates.

Ideally, in a low-colloid oil mud it would be desirable to have maximum filtration at the face of the bit but zero fluid and seepage losses in the annulus side of the hole. It is usually necessary to compromise in utilizing a low-colloid oil mud by allowing the fluid loss to increase in the oil mud system to a desired level and then holding it at that level in order to achieve a maximum fluid loss at the bit face and yet minimize the seepage loss or fluid in the side of the hole.

A wide range of particle sizes, including colloidal solids, are needed to prevent fluid loss and seepage loss. Since colloidal solids do reduce penetration rates, a technique to place fluid loss/seepage loss additives in the annulus side of the hole is needed.

TABLE 1

PROJECTED COST OF SEEPAGE LOSS/FLUID LOSS IN OIL MUD SYSTEMS

| ASSUMED COST, $/BBL | SEEPAGE/FLUID LOSS, BBL/HR | DAILY COST, $ | 30 DAY COST, $ |
|---|---|---|---|
| 80 | 2 | 3,840 | 115,200 |
| 100 | 2 | 4,800 | 144,000 |
| 120 | 2 | 5,760 | 172,800 |
| 140 | 2 | 6,720 | 201,600 |
| 80 | 4 | 7,680 | 230,400 |
| 100 | 4 | 9,600 | 288,000 |
| 120 | 4 | 11,520 | 345,600 |
| 140 | 4 | 13,440 | 403,200 |
| 80 | 6 | 11,520 | 345,600 |
| 100 | 6 | 14,400 | 432,000 |
| 120 | 6 | 17,280 | 518,400 |
| 140 | 6 | 20,160 | 604,800 |
| 80 | 8 | 15,360 | 460,800 |
| 100 | 8 | 19,200 | 576,000 |
| 120 | 8 | 23,040 | 691,200 |
| 140 | 8 | 26,880 | 806,400 |
| 80 | 10 | 19,200 | 576,000 |
| 100 | 10 | 24,000 | 720,000 |
| 120 | 10 | 28,800 | 864,000 |
| 140 | 10 | 33,600 | 1,008,000 |

During the drilling of thick sections of highly permeable formations, seepage losses and fluid can be excessive when low-colloid oil mud systems are used.

Several suggestions have been made for controlling excessive losses in such systems. These include: 1. by-passing all solids removal equipment on a temporary basis and allowing drilled solids to be retained until sufficient bridging particles accumulate and form a seal;

2. adding bridging solids, such as fine nut hulls, mica, unmodified lignite, modified asphalts, etc.;

3. addition of a low concentration of filtration control additive for excessive filtration.

Typically, products such as fine mice and fine nut hulls have been used in oil mud systems, more from the fact that they do not add to the mud problems than from actually providing much assistance in loss control.

Historically, lost circulation, seepage loss, and fluid loss problems have been more difficult to control in oil mud systems than in water base muds because most common additives tended to drastically alter the properties of the oil muds. Cellulose base materials such as wood fibers, ground paper, cotton seed hulls, bagasse, etc., tend to preferentially water wet and can result in breaking the emulsion and "flipping" an expensive system. When this occurs, fluid loss becomes extremely high, weighting material water wets and settles out, water shows up in the filtrate, and other adverse effects occur. The system then has to be reconditioned. This usually results in the system being displaced, hauled into a plant and reconditioned at an extremely high cost. Ground plastics have been suggested and in some cases used, but again, not without problems. Some materials contain plasticizers and other additives that tend to also act as emulsion breakers at low concentrations.

In other cases products such as cellophane, although plastic in nature, have a peculiar wettability and can result in adsorption of water from the emulsion creating water wetting problems.

Many of the modified asphalts are effective as both seepage loss additives (when sized) or as fluid loss additives due to their colloidal nature. These products generally tend to increase the viscosity of the oil phase and add to the colloidal concentration of particles, resulting in decreased penetration rates. Moreover, relatively high concentrations of these products are needed in order to be effective fluid loss or seepage loss additives.

A secondary effect of many of the conventional loss control additives is their ability to absorb the wetting agents from the oil mud and thus deplete the system of the excess required to maintain a stabilized system.

Sometimes the effect of addition of loss control additives to the low-colloid oil systems are not evident immediately. Both time and temperature play a significant role in the effect of such additives. Thus, the addition of loss conttol additives to these oil mud systems should be selected with care.

Another common problem with many conventional loss control additives, particularly in the seepage loss range, is particle size. Typically, a treatment to the system is made. The material is circulated down hole one time, comes back to the surface and is taken out by even coarse shaker screens, unless the solids-control system is bypassed, and this causes other problems. Not only does additional material have to be added for loss control, but additional emulsifiers and wetting agents have to be added as a result of their being removed by adsorption/absorption on the loss control additives that are being discarded. Thus, an inexpensive loss control additive can become very costly in a low-colloid oil mud if it is not designed specifically for such a system and if it is not applied correctly.

SUMMARY OF THE INVENTION

I have now found that a concentrated "pill" of fluid loss control additive (hereinafter sometimes referred to as FLCA) and/or seepage loss control additive (hereinafter sometimes referred to as SICA) can be pumped slowly up the annulus between the drill pipe and the sides of the borehole to minimize the concentration of colloidal solids in the drilling fluid yet reduce the total amount of seepage loss and fluid loss from the drilling fluid. In this slugging technique, the pill returned to the surface is caught and removed from the drilling fluid in order to prevent a buildup of colloidal particles in the drilling fluid. By utilizing my slugging technique, the wall of the borehole is actually coated with the fluid loss and seepage loss control additives and the colloidal content of the drilling fluid system is kept at an extremely low concentration compared to what might be necessary to treat the whole system.

Some theoretical projections have been made as to how much material (given certain assumptions in terms of type of material, the density, the thickness of the wall cake, the concentration of additive in the wall cake, etc.) might be required to treat given intervals of a certain diameter wellbore. The data is given in Table 2.

Typically, 135 pounds (lb.) of an additive having a density of 50 pounds per cubic feet (lb./cu.ft.) is required to lay down a uniform 1/32 inch wall cake for every 1000 feet of a 4 inch diameter borehole. Approximately 1000 feet of a 12 inch diameter borehole will require 408 lb. of additive to lay down a 1/32 inch cake if the additive weighs approximately 50 lb./cu.ft. A 20,000 foot borehole, 4 inches in diameter, will require 2700 lb. of a fluid loss or seepage loss additive to coat the entire borehole with a 1/32 inch wall cake. For comparison purposes, a 2,000 barrel (bbl.) (42 gallons/barrel) system required to drill a 20,000 foot hole under normal circumstances would require 10,000 lb. of additive (initial treatment only) if the entire system were treated with an average of 5 lb./bbl. Although this treatment will provide low seepage losses/fluid losses throughout the hole, it will require a significant increase in the colloidal content of the mud and a tendency to reduce penetration rates.

| CONCENTRATION OF SEEPAGE/FLUID LOSS ADDITIVE REQUIRED, LB/1000 FT. HOLE | | |
|---|---|---|
| HOLE DIAMETER, INCHES | CAKE THICKNESS, INCHES | ADDITIVE REQUIRED, LB/1000 FT* |
| 4 | 1/32 | 135 |
| 4 | 3/32 | 399 |
| 4 | 5/32 | 655 |
| 4 | 7/32 | 902 |
| 4 | 9/32 | 1141 |
| 4 | 13/32 | 1593 |
| 4 | 15/32 | 1806 |
| 6 | 1/32 | 203 |
| 6 | 3/32 | 604 |
| 6 | 5/32 | 996 |
| 6 | 7/32 | 1380 |
| 6 | 9/32 | 1755 |
| 6 | 13/32 | 2479 |
| 6 | 15/32 | 2829 |
| 8 | 1/32 | 271 |
| 8 | 3/32 | 808 |
| 8 | 5/32 | 1337 |
| 8 | 7/32 | 1857 |
| 8 | 9/32 | 2369 |
| 8 | 13/32 | 3366 |
| 8 | 15/32 | 3852 |
| 10 | 1/32 | 339 |
| 10 | 3/32 | 1013 |
| 10 | 5/32 | 1678 |
| 10 | 7/32 | 2334 |
| 10 | 9/32 | 2982 |
| 10 | 13/32 | 4253 |
| 10 | 15/32 | 4875 |
| 12 | 1/32 | 408 |
| 12 | 3/32 | 1218 |
| 12 | 5/32 | 2019 |
| 12 | 7/32 | 2812 |
| 12 | 9/32 | 3596 |
| 12 | 13/32 | 5139 |
| 12 | 15/32 | 5898 |

*Assume additive density of 50 lb/cu ft. and a solid, uniform coating.

The preferred pill for use in relaxed filtrate, low-colloid invert emulsion drilling fluids comprising a liquid oleaginous suspension of an organophilic cellulose SLCA and an organophilic lignite FLCA as more particularly disclosed hereinafter.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DESCRIPTION OF THE PREFERRED EMBODIMENTS

A concept for controlling the loss of fluid from a drilling fluid has been developed which involes a slugging technique. A concentrated pill of a FLCA and a SLCA is pumped extremely slowly up the annulus in order to maximize the concentration of additive involved in coating the open hole. Once the material is received back on surface, it can be caught in a slugging tank and the additive concentration replenished until the next circulation is required. This technique can reduce the amount of the fluid loss material/seepage loss additives required to achieve low annular losses while not interfering with the penetration rates that are ordinarily achieved with low-colloids oil muds. The fluid loss/seepage loss additives have a limited exposure to the entire system, and are not allowed to build up in the system as they would under conventional treating techniques.

A typical slug or pill will consist of 20–50 bbl. total volume. The pill can be circulated around slowly on a regular basis. The volume, frequency of circulation, and composition of the pill can be determined by the severity of the seepage loss or fluid loss, hole diameter, amount of open borehole, differential pressure, and density of the drilling fluid. Markers of various types such as plastic chips can be put in the pill in order to retrieve and isolate a major portion of it when it is returned to the surface. Additional volume can be prepared and the additive concentration can be brought back up in concentration in preparation for the next circulation.

Generally the pill will contain from about 10 to about 75 lb./bbl. of FLCA and from about 10 to about 75 lb./bbl. of SLCA, preferably from about 20 to about 50 lb./bbl. of each additive, suspended in a suitable liquid. The pill should have a density equivalent to or slightly greater than the density of the drilling fluid in which it is circulated in order to contain the formation pressure and to lay down the required filter cake on the sides of the borehole. Thus the pill will contain sufficient weight material, such as barite, ilmenite, galena, hematite, magnetite, specular hematite, siderite, and the like, to provide the required density. Preferably the FLCA and the SLCA are suspended in the drilling fluid as the liquid phase of the pill. For drilling fluids having a continuous oil phase, an oleaginous liquid is required as the suspension medium.

The oleaginous liquid can be any organic liquid which is compatible with the organic liquid phase present in the drilling fluid in which the pill is circulated. Preferably the oleaginous liquid used in preparing the pill is the same as the oleaginous liquid present in the drilling fluid, and, indeed, may be the drilling fluid itself if sufficient additives can be incorporated. Generally the oleaginous liquid is a petroleum oil, and most generally is an ordinary diesel oil, although it may be rather lighter, such as kerosene; or somewhat heavier, such as fuel oil; or indeed it may simply be crude oil, topped or untopped. The nature, availability and cost of crude oil from adjacent fields may often determine whether it is used or a diesel oil. Relatively refined oils such as a lubricating oil, white oils, biodegradable, non-polluting mineral oils, and like oleaginous liquids can be used to prepare the pills of my invention.

The pill may optionally contain a suspending agent to keep the FLCA and SLCA uniformly suspended in the oleaginous liquid if the pill is to be stored quiescent for a period of time sufficient to allow settling of the FLCA and SLCS. Preferred suspending agents are the organophilic clay gellants, particularly the organophilic bentonite and organophilic hectorite clay gellants. Exemplary organophilic clays are given in the following U.S. patents, all incorporated herein by reference for all purposes: U.S. Pat. Nos. 2,966,506 (Jordan); 3,537,994 (House); 3,831,678 (Mondshine); 3,929,849 (Oswald); 4,053,493 (Oswald); 4,081,496 (Finlayson); 4,105,578 (Finlayson et al.) and 4,208,218 (Finlayson). Other useful suspending agents include asbestos, particularly chrysotile asbestos; polymers soluble in the oleaginous liquid; gel-forming polymers; high molecular weight soluble or dispersible organic materials such as alkenyl succinic anhydrides and salts thereof in which the alkenyl group contains at least 30 carbon atoms; soaps such as alkali metal and alkaline earth metal salts of fatty acids; and the like, as is well known in the art.

The fluid loss control additives which are preferred for use in this invention are the organophilic polyphenolic acids prepared by adduction of a polyphenolic acid with an organic cationic compound or an amino compound. The preferred polyphenolic acid is humic acid or a material containing at least about 50% by weight of humic acid such as leonardite and certain lignites. Representative organophilic polyphenolic acids are disclosed in the following U.S. patents, all incorporated herein by reference for all purposes: U.S. Pat. No. 3,168,475 (Jordan et al.); 3,232,870 (Cowan et al.); 3,281,458 (Jordan et al.); 3,379,560 (Beasley et al.); 3,425,953 (Cowan et al.); 3,494,865 (Andrews et al.); 3,538,071 (Kim); 3,671,427 (Andrews et al.); and 3,671,428 (Kim). The most preferred organophilic polyphenolic acids are those claimed in copending patent application Ser. No. 272,684 filed June 11, 1981, now U.S. Pat. No. 4,421,655.

In general, the organic cationic compound or amino compound which can be adducted with the polyphenolic acid to obtain the organophilic polyphenolic acid fluid loss control additives for use in this invention are selected from the group consisting of compounds, I, II, III, IV, or mixtures thereof, wherein:

$$[RR_1N].aD \qquad \text{I}$$
$$[R-NR_2-(C_xH_{2x}NR_2)_yH].aD \qquad \text{II}$$
$$[R_3-CO-NH-(C_xH_{2x}NR_2)_zH].aD \qquad \text{III}$$

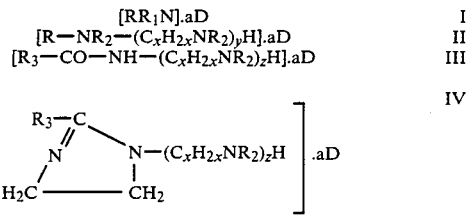

IV where R is an aliphatic group consisting from 12 to 30 carbon atoms; $R_1$ is hydrogen or an aliphatic group containing from 1 to 30 carbon atoms; $R_2$ is hydrogen or $R_3$-CO; $R_3$ is an aliphatic group containing from 11 to 29 carbon atoms; x, y, and z are integers; $2 \leq X \leq 6$; $y \leq 1$; $z \leq 1$; D is a compound reactive with free amino radicals (i.e., the non-amide radicals) to convert the amino radicals to quaternary ammonium radicals; and a is an amount of the compound D sufficient to convert from O up to all of the free amino radicals in the amino compound to cationic ammonium radicals.

Preferably: R is an aliphatic group containing from 16 to 18 carbon atoms; $R_1$ is an aliphatic group containing from 16 to 18 carbon atoms; $R_3$ is an aliphatic group containing from 15 to 17 carbon atoms; $2 \leq x \leq 3$; $1 \leq y \leq 5$; $1 \leq z \leq 6$; and D is selected from the group consisting of organic acids, hydrochloric acid, methyl chloride, ethyl chloride, benzyl chloride, dimethyl sulfate, diethyl sulfate, chloro silanes, ethoxy silanes and mixtures thereof.

It is preferred that the amino compound contain at least one free amino group (non-amide, non-quaternary ammonium groups) per molecule when adducting the amino compound with a polyphenolic acid in the acid form. This enhances the chances of obtaining a neutralization reaction (and possibly an amidation reaction) of the free amino groups in the amino compound with the acid groups in the polyphenolic acid.

It is preferred that the amino compound contain at least one quaternary ammonium group per molecule when adducting the amino compound with a salt of a polyphenolic acid, preferably an alkali metal or ammonium salt. This enhances the changes of obtaining a double decomposition, cation exchange-type of reaction between the quaternary ammonium group and the polyphenolic acid salt group.

The terms "adducted" and "adducting" when referring to the reaction between the amino compound and the polyphenolic acid compound is used in the modern sense to indicate a reaction wherein the binding forces causing the amino compound and the polyphenolic acid to form a product may be of an absorptive nature, an absorptive nature, by salt formation, by amidation, by double decomposition, and by combinations of these forces.

The methods of combining the amino compound and the polyphenolic acid compound are well known in the art as disclosed in the aforesaid patents incorporated herein by reference.

The seepage loss control additives which are preferred for use in this invention are hydrophobic, organophilic, water wettable fibrous materials (hereinafter sometimes referred to a HOWWFM) as disclosed in copending patent application Ser. No. 269,494 filed June 1, 1981, now U.S. Pat. No. 4,428,843 incorporated herein by reference for all purposes.

The term "hydrophobic" as used herein indicates that the fibrous material will float when added to water. The term "organophilic" as used herein indicates that the fibrous material will preferentially sorb oil and collect in the oil phase when added to a mixture of oil and water. The term "water wettable" as used herein indicates that the fibrous material will be wetted by water when agitated in water, as by mixing.

The HOWWFM which are useful in this invention include naturally occurring fibrous materials or synthetic fibers which have been treated to render them hydrophobic and organophilic while maintaining their ability to be wet with water. Such treatments may be chemical, thermal, mechanical, or combinations thereof. The extent of surface treatments must not be such as to render the fibrous material incapable of being wetted when agitated with water.

Suitable HOWWFM and treatments thereof are disclosed in the following U.S. patents, incorporated herein by reference: U.S. Pat. Nos. 2,211,976—treated cellulose fibers; 3,464,920—organosilane treated materials; 3,536,615—carbon coated particulate materials; 3,562,153—particulate materials coated with a colloidal hydrophobic metal or metalloid oxide, 3,791,990—dried peat; and 4,240,800—dried bagasse.

Cellulose fibers may be rendered hydrophobic by incorporating therein a phenol containing at least one aliphatic or cycloaliphatic residue having at least 6 carbon atoms, and treating the fibers with an aliphatic aldehyde. The phenol and aldehyde treatments may be effected simultaneously, or their condensation product may be used directly, and the treated fibers subjected to heat treatment.

Cellulose may also be rendered hydrophobic by surface treating cellulose with a Lewis-acid type catalyst and initiating polymerization of a hydrocarbon monomer to form a surface coating of a hydrocarbon polymer on the cellulose. Thus cellulose dried to a moisture content of 3% can be cooled to $-80°$ C. in nitrogen and treated with a solution of $BF_3$ in liquid nitrogen. Isobutylene or $\alpha$-methylistyrene polymerize almost instantaneously upon contacting the treated cellulose.

The particle size of the HOWWFM must exhibit a wet screen analysis of at least 90% by weight passing through a 100 mesh (U.S.) screen. That is, at least 90% by weight of the HOWWFM present in a water suspension will pass through a 100 mesh screen.

The hydrophobic, organophilic and water wettable character of the HOWWFM is very important as it allows this material to be utilized in both oil base and water base fluids. Although hydrophobic and organophilic, the HOWWFM readily wets in water containing a surfactant or upon agitation to reduce the seepage or spurt loss of aqueous well working fluids. Furthermore, the HOWWFM is effective in all aqueous systems including saturated brines.

The most preferred HOWWFM is conveniently prepared by treating raw cotton in an air dried condition, containing from about 0% to about 20% water, by weight, with dry hydrochloric acid gas in an amount from about 0.3% to about 3% by weight of the cotton at a temperature in the range from about 75° F. to about 180° F. during a treatment period from about 10 minutes to about 48 hours. During this treatment the cotton linters are mechanically degraded by buffering, augering, abrading, vibrating, etc. Thereafter the HOWWM may be further mechanically degraded, if desired, by any suitable grinding means such as a hammer mill. It is important to use raw unprocessed cotton, preferably cotton linters, which have not been treated to remove any of the waxes or oils therefrom. In this manner there is produced a micronized, surface modified cotton which is hydrophobic, organophilic, and water wettable.

Other SLCA which may be used include lignite, calcium carbonate, finely ground nut shells, finely ground mica, and the like.

The slugging technique for controlling the loss of fluid from a drilling fluid is also applicable to water base drilling fluids particularly the low solids, polymer-containing, drilling fluids. In this case the pill contains a suspension of a FLCA and a SLCA in an aqueous liquid, preferably the same as is present in the drilling fluid. As with the oleaginous base pills, the drilling fluid may be used as the liquid phase if its viscosity is sufficiently low to allow the required concentrations of FLCA and SLCA to be suspended therein for circulation.

The preferred SLCA for use in aqueous base pills is the hydrophobic, organophilic, water-wettable fibrous material discussed hereinbefore. Other SLCA which may be used in aqueous base pills are calcium carbonate, finely ground nut hulls, finely ground mica, and other finely ground materials having a particle size distribution sufficient to effect bridging of the formation.

The FLCA for use in aqueous base pills may be any of a wide variety of known materials which are compatible with the water base drilling fluid and the liquid phase of the pill. Exemplary materials include: bentonite; lignite; pregelatinized starch; modified starches; cellulose derivatives such as carboxymethyl cellulose, hydroxyethyl cellulose, carboxymethyl hydroxyethyl cellulose, and the like; acrylic polymers; and mixtures thereof.

The pill will contain from about 10 lb./bbl. to about 75 lb./bbl. of the FLCA and from about 10 lb./bbl. to about 75 lb./bbl. of the SLCA. The concentration of FLCA and SLCA required to decrease the loss of fluid from a drilling fluid to the formation being drilled increases as the peremeability of the formation being drilled increases and as the differential pressure between the drilling fluid and the formation increases. The concentration of FLCA and SLCA decreases as the density of the pill increases due to the higher solids concentration in the pill. Pills having a density greater than about 14 lb./gal. may only need a high concentration of FLCA to adequately control the loss of fluid to the formation. Generally, as the density of the pill increases, the weight ratio of SLCA to FLCA decreases. Thus the weight ratio of SLCA to FLCA will be from about 75:25 to about 5:95 in the pill.

The following is a specific example of the slugging technique of this invention for reducing the loss of fluid from a drilling fluid to the formations being drilled, and of the preferred oleaginous base pills of this invention for use in relaxed filtrate, low-colloid invert emulsion drilling fluids, and are presented to illustrate the invention, but are not to be construed as limiting it in any manner. All rheology testing was undertaken according to the procedures published by the American Petroleum Institute in publication RP 13B. A standard test is not available for evaluating the seepage loss of drilling fluids, particularly in oil base drilling fluids. Accordingly, a procedure has been developed to simulate losses in low pressure, unconsolidated sands. This procedure is as follows:

1. Place 100 grams of coarse blasting sand (or 10-20, or 16-30 mesh sand) in an API filter press cell with screen only (no paper).
2. Wet sand pack with water—allow to seep through until water has drained completely—place in press—apply 100 psi pressure but don't blow dry (eliminate free water only)—bleed pressure to atmosphere.
3. Place container under cell.
4. Fill the cell with the sample to be evaluated.
5. Close cell and pressurize to 100 psi.
6. Catch seepage until sample has shut off (drops only).
7. Measure volume to shut-off in ml.
8. Measure time to shut-off in seconds.

EXAMPLE 1

A field sample of a relaxed filtrate, low-colloid invert emulsion drilling fluid having a density of 11 lb./gal. was treated with 50 lb./bbl. of drilling fluid of VEN-CHEM 205A organophilic lignite fluid loss control additive and 50 lb./bbl. of drilling fluid of VEN-FYBER 201 hydrophobic, organophilic, water-wettable cellulose seepage loss control additive, mixed 5 minutes in a Waring Blendor, and thereafter tested for API rheology and seepage loss. The data obtained are given in Table 3.

The data indicate that the FLCA and SLCA effectively decreased the loss of fluid through the sand pack, and that the surface of the sand pack was effectively sealed against continued high losses of fluid after the pill containing the drilling fluid, FLCA and SLCA was removed from the cell.

TABLE 3

| Seepage Control Test in 11 lb/gal Low-Colloid Oil Mud | | | |
|---|---|---|---|
| Sample | A | B | C* |
| Base Field Mud, bbl. | 1 | 1 | 1 |
| Seepage Control Additive, lb. | | 50 | * |
| Fluid Loss Control Additive, lb. | | 50 | * |
| Stir 5 minutes at high shear | | | |
| Plastic Viscosity, cp | 76 | 118 | * |
| Yield Point, lb/100 sq. ft. | 25 | 44 | * |
| Gel Strength, lb/100 sq. ft. - 10 sec/10 min | 6/10 | 9/18 | * |
| Seepage Loss, ml | no control, blow out | 22 | 23 |
| Time, sec | 60 | 4 | 4 |

*Sealed sand pack surface with the pill shown in Sample B. Displaced the pill with 100% No. 2 Diesel Oil and retested with No. 2 Diesel Oil.

I claim:

1. A method of decreasing the loss of fluid to the subterranean formation contacted by an invert emulsion drilling fluid, which comprises: (1) preparing a concentrated pill containing from about 10 pounds per 42 gallon barrel (ppb.) to about 75 ppb. of a fluid loss control additive and from about 10 ppb. to about 75 ppb. of a seepage loss control additive in a liquid which is compatible with said invert emulsion drilling fluid; (2) circulating said pill in the borehole traversing said formation containing said invert emulsion drilling fluid to coat the wall of the borehole with said fluid loss control additive and said seepage loss control additive; (3) isolating said pill from said invert emulsion drilling fluid after said pill has been circulated throughout said borehole; (4) continuing the circulation of said invert emulsion drilling fluid; and (5) periodically repeating steps (2) and (3) as necessary to decrease the loss of fluid to said formation from said invert emulsion drilling fluid; wherein said fluid loss control additive is an organophilic polyphenolic acid said polyphenolic acid being humic acid or a humic acid containing material and wherein said seepage loss control additive is selected from the group consisting of cellulose which has been treated to be hydrophobic and organophilic, dried bagasse, dried peat, lignite, calcium carbonate, finely ground nut shells, and finely ground mica.

2. The method of claim 1 wherein said pill contains from about 20 pounds per 42 gallon barrel (ppb.) to about 50 ppb. of said fluid loss control additive and from about 20 ppb. to about 50 ppb. of said seepage loss control additive.

3. The method of claim 1 wherein said pill additionally contains a weighting agent and a suspension agent, and wherein the density of said pill is the same as or greater than the density of said invert emulsion drilling fluid in which it is circulated.

4. The method of claim 1 wherein said liquid is said invert emulsion drilling fluid.

5. The method of claim 1 wherein said seepage loss control additive is a hydrophobic, organophilic, water wettable fibrous material selected from the group consisting of cellulose which has been treated to be organophilic and hydrophobic, dried bagasse, and dried peat.

6. The method of claim 1 wherein said seepage loss control additive is a hydrophobic, organophilic, water wettable fibrous cellulose which has been treated to be organophilic and hydrophobic.

7. The method of claim 1 wherein said seepage loss control additive is a hydrophobic, organophilic, water wettable cotton having a particle size such that at least 90% by weight of said cotton present in a water suspension will pass through a 100 mesh screen produced by the process comprising: reacting raw cotton with dry, gaseous hydrochloric acid in an amount from about 0.3% to about 3% by weight of the cotton at a temperature in the range from about 75° F. to about 180° F.; and mechanically degrading the cotton.

8. The method of claim 1 wherein said seepage loss control additive is selected from the group consisting of lignite, calcium carbonate, finely ground nut shells, and finely ground mica.

9. The method of claim 8 wherein said pill contains from about 20 ppb. to about 50 ppb. of said fluid loss control additive and from about 20 ppb. to about 50 ppb. of said seepage loss control additive.

10. The method of claim 8 wherein said pill additionally contains a weighting agent and a suspension agent, and wherein the density of said pill is the same as or greater than the density of said invert emulsion drilling fluid in which it is circulated.

11. The method of claim 8 wherein said liquid is said invert emulsion drilling fluid.

* * * * *